United States Patent
Jenkins

(10) Patent No.: US 6,982,744 B2
(45) Date of Patent: Jan. 3, 2006

(54) MULTI-POINT CALIBRATION METHOD FOR IMAGING LIGHT AND COLOR MEASUREMENT DEVICE

(75) Inventor: David R. Jenkins, Chapel Hill, NC (US)

(73) Assignee: Radiant Imaging, Inc., Duvall, WA (US)

( * ) Notice: Subject to any disclaimer, the term of this patent is extended or adjusted under 35 U.S.C. 154(b) by 496 days.

(21) Appl. No.: 10/122,586

(22) Filed: Apr. 15, 2002

(65) Prior Publication Data
US 2003/0193564 A1 Oct. 16, 2003

(51) Int. Cl.
*H04N 17/00* (2006.01)

(52) U.S. Cl. .................................. 348/189; 348/190

(58) Field of Classification Search ............... 348/189, 348/190, 180, 181, 187, 188; 702/66, 67, 702/69; 356/302, 303, 309, 319, 320, 402, 356/406, 408, 404
See application file for complete search history.

(56) References Cited

U.S. PATENT DOCUMENTS

| | | | |
|---|---|---|---|
| 4,962,425 A | 10/1990 | Rea | |
| 5,118,943 A | 6/1992 | Le Bars et al. | |
| 5,657,079 A * | 8/1997 | Thario et al. | 348/190 |
| 5,969,756 A * | 10/1999 | Buckley et al. | 348/190 |
| 6,219,099 B1 | 4/2001 | Johnson et al. | |
| 6,483,537 B1 * | 11/2002 | Mayer, III et al. | 348/180 |
| 6,525,772 B2 * | 2/2003 | Johnson et al. | 348/383 |
| 6,671,004 B1 * | 12/2003 | Runtze et al. | 348/745 |

* cited by examiner

*Primary Examiner*—Victor R. Kostak
(74) *Attorney, Agent, or Firm*—Stetina Brunda Garred & Brucker

(57) ABSTRACT

A multi-point calibration method is provided for an imaging light and color measurement device. A light emitting surface with a plurality of light emitting areas is provided. The luminance or color of each light emitting area of the light emitting surface at a specific angle is measured using a spot measurement instrument. By aligning the spot measurement instrument with one of the light emitting areas at a time, the luminance or color of the light emitting areas of the light emitting surface is measured. A measurement of the light emitting surface is made with the imaging light and color measurement device. A matrix of correction factors is calculated to correct the areas as measured by the imaging light and color measurement device to be equivalent to those measured by the spot photometer. While a display device is measured by the imaging light and color measurement device, the measured luminance or color values thereof are corrected by the screen gain correction matrix.

10 Claims, 5 Drawing Sheets

MULTI-POINT CALIBRATION METHOD FOR IMAGING LIGHT AND COLOR MEASUREMENT DEVICE

CROSS REFERENCE OF RELATED APPLICATION (Not Applicable)

STATEMENT RE: FEDERALLY SPONSORED RESEARCH/DEVELOPMENT (Not Applicable)

BACKGROUND OF THE INVENTION

The present invention relates to a multi-point calibration method for imaging light and color measurement devices.

In contrast to the conventional spot light and color measurement systems, an imaging light and color measurement device is able to measure the magnitude and color of light for many different data points at one time. To accomplish this, the imaging light and color measurement device images all light visible to the camera onto a detector array comprising thousands or millions of individual detectors. Further, in conventional spot measurement techniques, measurements are made over only a small area of the display device under test. Therefore, traditional measurement comprises an average color or luminance measurement taken over a single area (and measured by means of a single detector). FIG. 1 shows the conventional spot measurement technique for measuring a display screen 10 with an array of individual light emitting areas to be measured. In FIG. 1, by shifting the spot measuring camera 12, each light emitting area is measured individually. Therefore, a long time is consumed for measuring a display device with multiple light emitting areas using the conventional spot measurement instrument.

In contrast, the imaging light and color measurement device images the light entering the camera onto thousands or millions of detectors (pixels) and therefore is able to acquire much more data without moving the measurement instrument, as in the case with the prior art spectroradiometer, calorimeter, or luminance meter. The primary advantage of the multi-point imaging light and color measurement system is the speed with which it can acquire thousands or millions of data points thereby giving a complete analysis of the color and brightness characteristics of the source of light.

A charge-coupled device (CCD) detector is a very broadly applied device for the imaging photometer/radiometer/colorimeter. The CCD-based imaging systems have been used as imaging light and color measurement devices to quantifiably measure luminance, illuminance and color coordinates of light sources, display systems, illumination systems or any sources of light. The CCD-based imaging system captures images of a scene (or device) to be analyzed for luminance or color. In the case of CIE 1931 color space, each pixel comprising the image may contain light which has different (x,y) chromaticity coordinates. In the case of photopic or radiometric measurements, each pixel may receive a different magnitude of optical radiation. In practice, the spectral responsivity of the imaging light and color measurement device does not exactly match the CIE x,y,z chromaticity matching functions or a photopic response curve or a flat radiometric response curve. Therefore, calibration is required.

BRIEF SUMMARY OF THE INVENTION

The present invention provides a multi-point calibration method for an imaging light and color measurement device. When measuring a light emitting surface such as a display device screen, the prior art spot light and color measurement system is shifted to measure each location of interest on the screen, and traditionally each measurement is made at a specific angle to the surface, traditionally normal to the screen surface. When an imaging photometer or colorimeter it used to measure the luminance and color of a display device, it measures many locations of interest at the same time; however, the measurement device is not shifted for each measurement, and therefore each location is not measured at the same specific angle to the screen surface. The luminance and color value of light emitted from the screen is dependent on the angle from the screen surface it is emitted. For measurements where the quantity of interest for each location on the screen is luminance or color of the light emitted at a specific angle to the screen surface, when measuring with an imaging light and color measurement device, a calibration is required to obtain the correct value.

A display device is provided with a plurality of light emitting areas to be measured. The luminance and/or color of each light emitting area of the display device is measured at a specific angle to the surface of the display screen using a spot measurement instrument. By aligning the spot measurement instrument with one of the light emitting areas each time, the luminance or color at a specific angle to the display for all the light emitting areas is measured. A measurement of the display device is then made with the imaging light and color measurement device. A matrix of correction factors is calculated to correct the points as measured by the imaging light and color measurement device. A matrix of correction factors is calculated to correct the points as measured by the imaging light and color measurement device to be equivalent to those measured by the spot photometer. In order to correct all points measured by the imaging light and color measurement device (possibly 1 million points or more), correction factors can be created for a correction matrix for all of the pixels of the imaging light and color measurement system. These correction factors can be created by interpolation between the measured points or by creating a correction function that calculates the correction factors for the entire matrix. The calculated correction matrix is referred to as the screen gain correction matrix. Using the correction matrix, all subsequent measurements of the display device made by the imaging light and color measurement device can be corrected to yield to the value as would be obtained measuring the light emitting areas at a specific angle to the surface of the display screen.

The above screen gain correction coefficient matrix varies for different display devices and test setups (e.g. angle to screen measured by spot photometer, imaging light and color measurement device location relative to the screen, etc.). Therefore, the screen gain correction matrices for various display devices and test set-up are can be obtained in advance and saved in software. When luminance or color values for one particular display device and test set-up are measured by the imaging light and color measurement system, the parameters of the display device and test set up are input to the software, such that the corresponding screen gain correction matrix of function is retrieved. The measured luminance or color values can thus be corrected thereby.

BRIEF DESCRIPTION OF THE DRAWINGS

These, as well as other features of the present invention, will become more apparent upon reference to the drawings wherein.

DETAILED DESCRIPTION OF THE INVENTION

The present invention provides a multi-point calibration method for an imaging light and color measure device such as an imaging photometer, radiometer and calorimeter. In the following embodiment, a CCD device is used as an example for introducing the calibration method provided by the present invention. It will be appreciated that the application of the present invention is not limited by the CCD device only. In fact, the multi-point calibration method can be applied to all kinds of imaging light and color measurement systems that are able to collect light or color data for many points within the field of view thereof.

Figure 2:
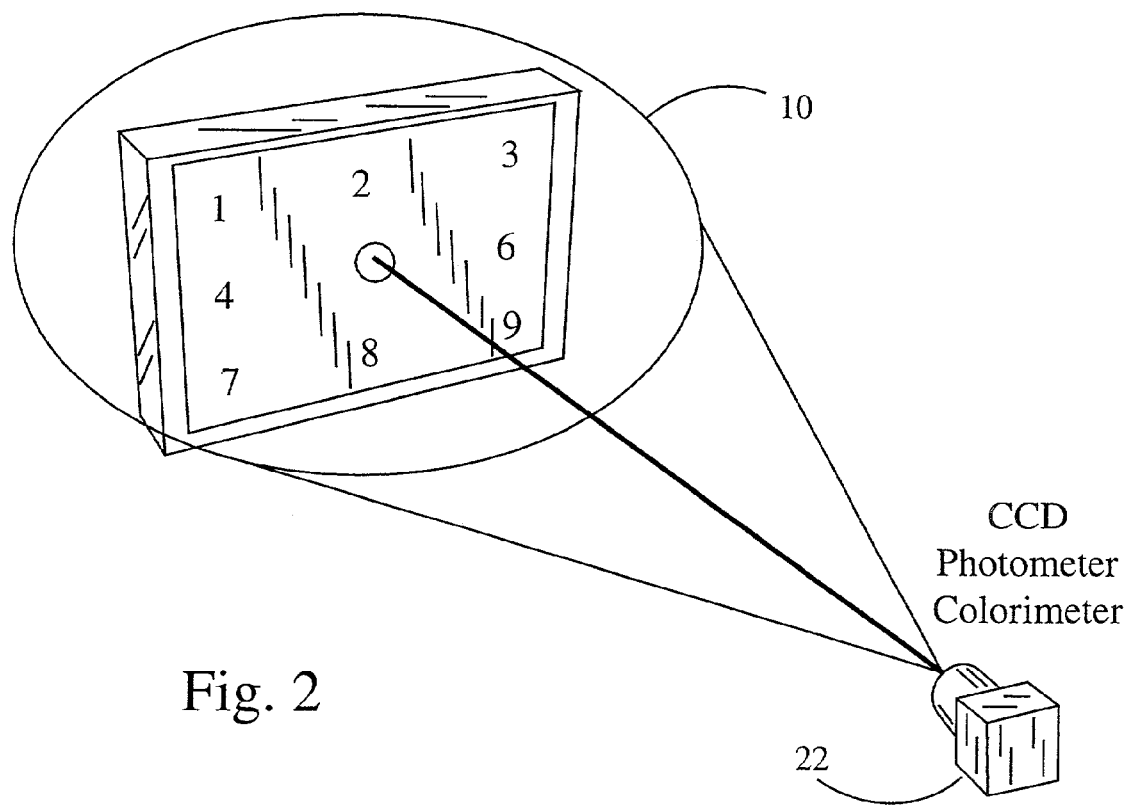
FIG. 2 shows imaging light and color measurement using a CCD photometer/colorimeter.

FIG. 2 shows an imaging light and color measurement using a CCD photometer/colorimeter. As shown in FIG. 2, multiple points of luminance and chromaticity coordinate data of a display device 10 can be taken by the CCD photometer/colorimeter 22 at one time. For example, the current development and technique allows the CCD device to measure luminance and chromaticity coordinate data for 250,000 points in less than 20 seconds without any difficulty.

Figure 3:
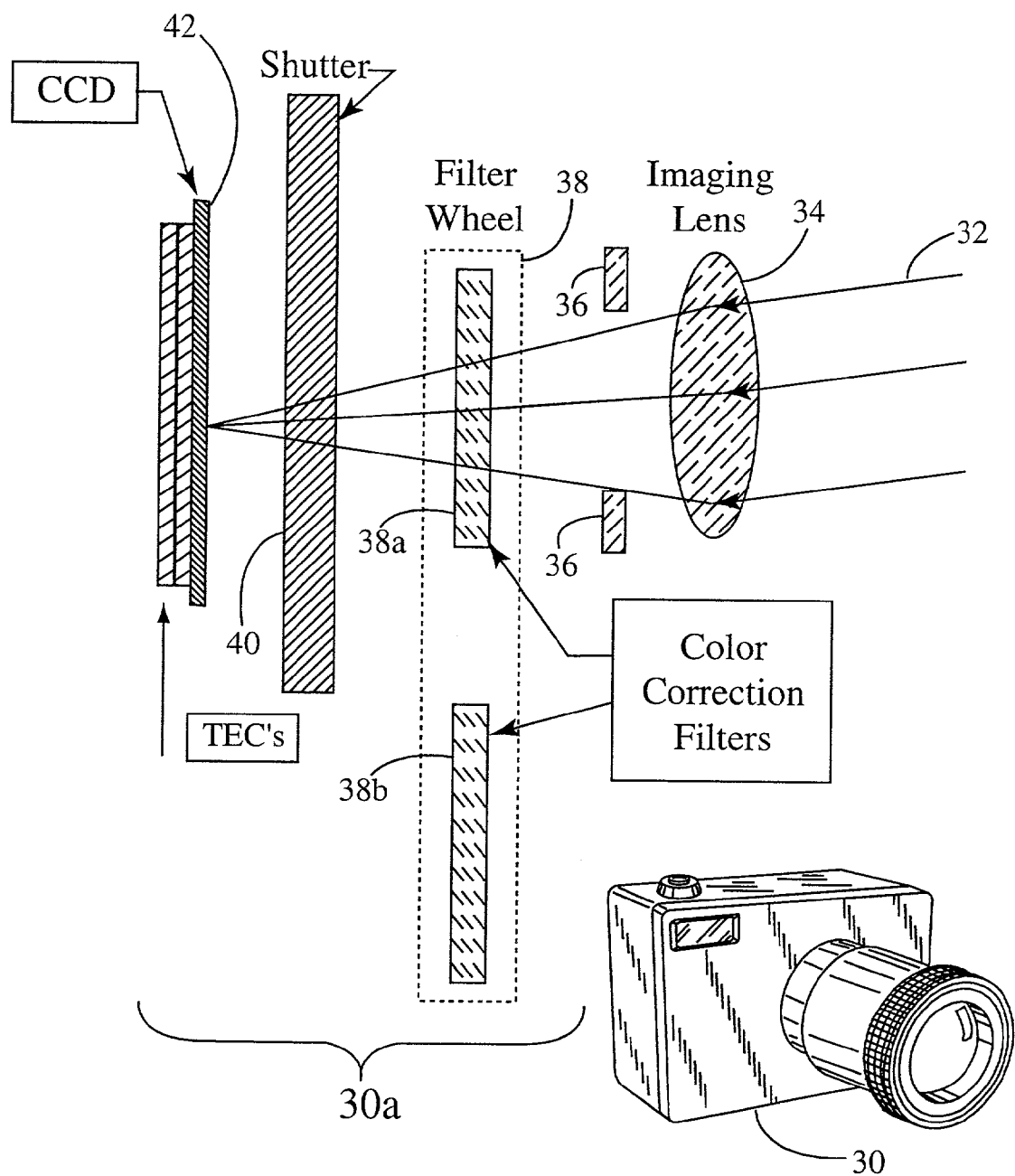
FIG. 3 shows a schematic view of an imaging light and color measurement system camera in one embodiment of the present invention.

FIG. 3 shows the external structure and a schematic view of the internal structure of one embodiment of a CCD tristimulus calorimeter. The external feature of the CCD tristimulus calorimeter is shown and denoted by the reference numeral 30. The setup 30a shows the internal arrangement of the CCD tristimulus calorimeter 30. In the internal setup 30a, the incident light beams 32 first travels through an imaging lens 34 to be converged and focused onto the CCD array 42. The CCD array 42 functions similarly to the film in the traditional camera. Before being focused onto the CCD array 42, the light beams 32 further travel through an aperture stop 36, a filter wheel 38 which allows the light beams 32 to travel through various color filters (38a and 38b), and a shutter 40.

Figure 4:
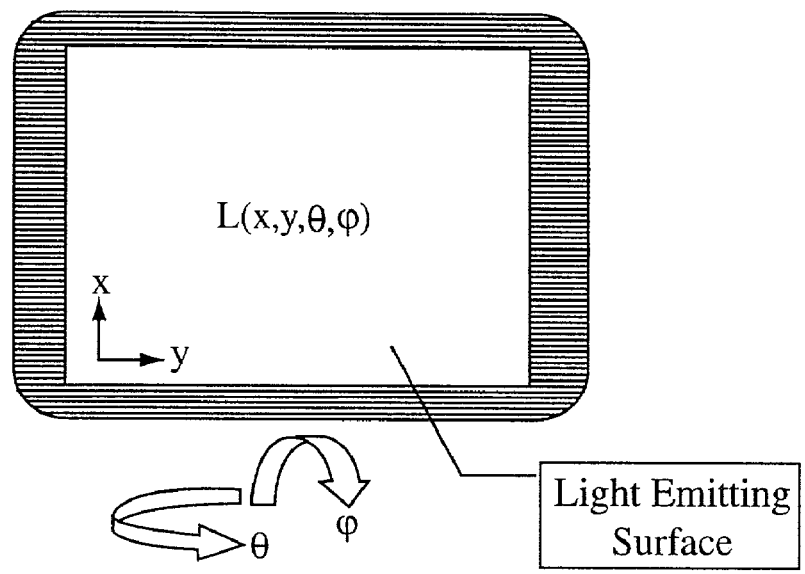
FIG. 4 shows the spatial and spherical angular coordinates of a flat display device.

The optical radiation originated from, including emitted, reflected, or transmitted by any surface can be completely described by the spectral radiance function $R(x,y,z,\theta,\phi,\lambda)$. Where x, y, z are the spatial coordinates of the surface, $\theta$, $\phi$ are the spherical angular coordinates representing the direction the light is traveling, and $\lambda$ is the wavelength of the light. For visible light, the luminance function is $L(x,y,z,\theta,\phi)$ and the CIE x and y color functions are $CIEx(x,y,z,\theta,\phi)$, $CIEy(x,y,z,\theta,\phi)$. The luminance and color are functions of the position of the light emitting on the surface (x,y,z) and angle of light originating from the surface $(\theta,\phi)$. It is routinely necessary to measure the luminance and color of the light leaving a surface, such as a display screen or a display device. In general, the luminance and color of a display device varies as a function of the spatial coordinates of the screen and as a function of angular coordinates. The angular definitions for the luminance of a display device 60 is shown as FIG. 4.

Figure 5:
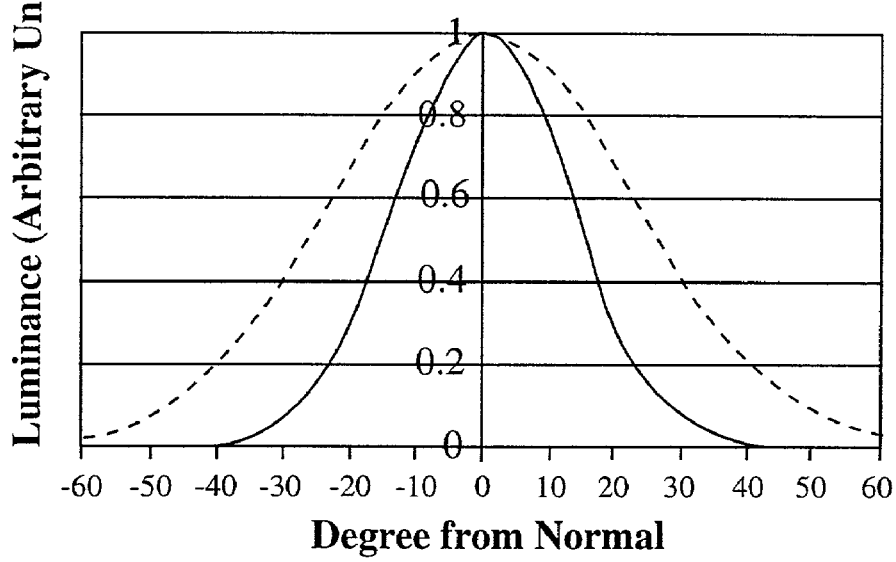
FIG. 5 shows the luminance as a function of spherical angular coordinates representing the direction which the light is traveling.
Figure 6:
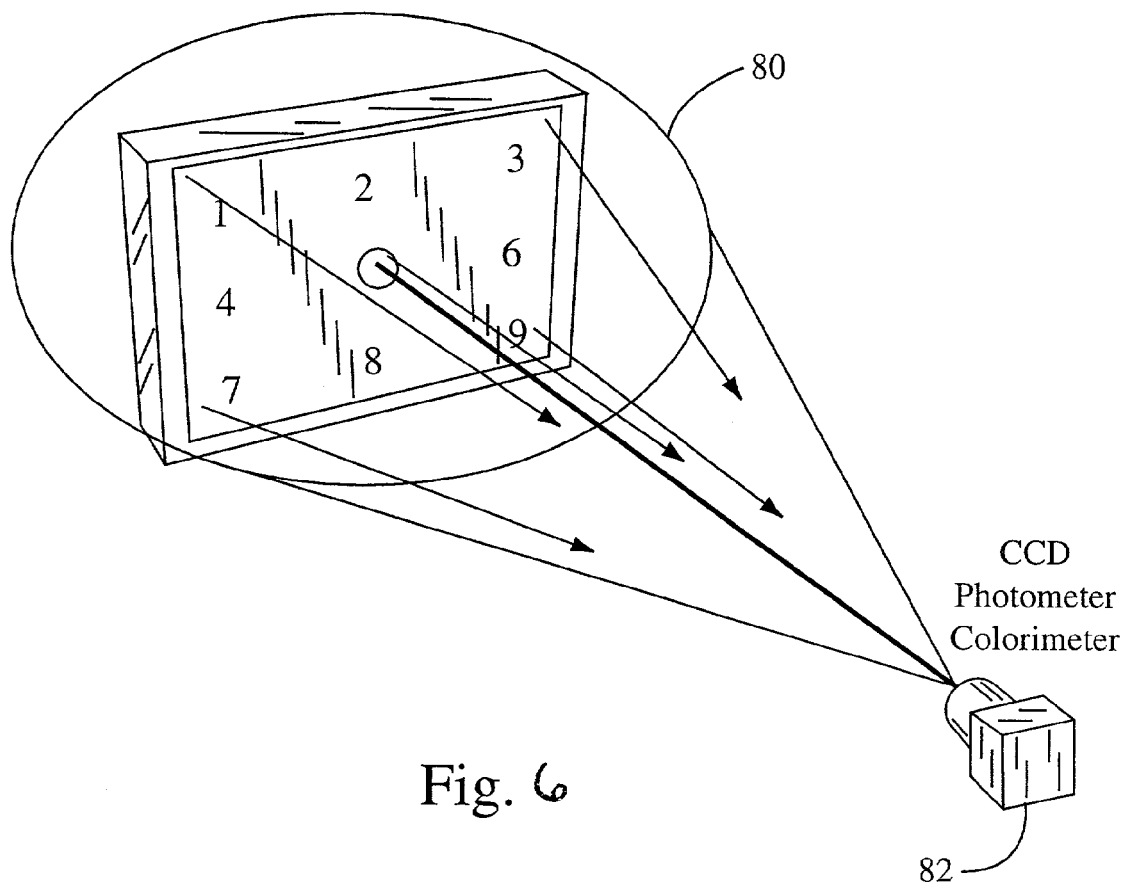
FIG. 6 shows a CCD photometer/colorimeter measuring a display device.
Figure 7:
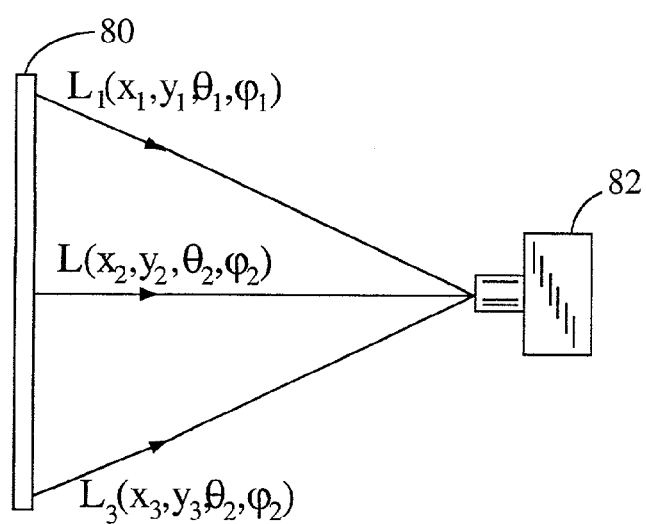
FIG. 7 shows the side view of luminance measured by the CCD device as shown in FIG. 2.
Figure 8:
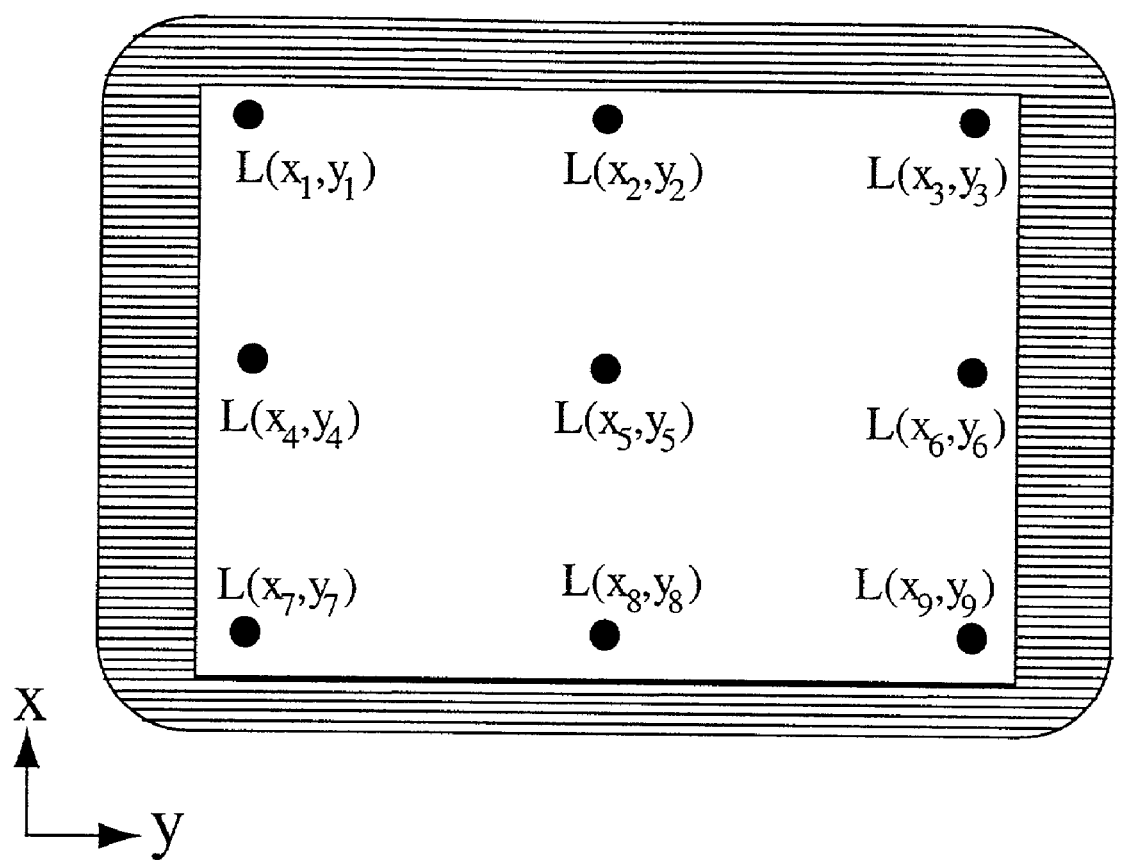
FIG. 8 shows the coordinates of luminance of a display device.

For a particular x,y location on a flat screen surface (z=0), FIG. 5 shows how luminance can vary as a function of angles $\theta$ and $\phi$. The curves in FIG. 5 are commonly referred as screen gain functions, where the dash curve is the screen gain caused by angle $\phi$, and the solid curve is the screen gain caused by angle $\theta$. As shown in FIG. 5, the luminance has a maximum value with an angle $\theta$ and $\phi$ equal to 0 degree, which is with the emitted light normal to the display device. However, as shown in FIG. 6, in practical application, an imaging light and color measurement device 82 is placed some finite distance from a display screen, and light traveling in a direction other than the one normal to the display screen 80 is measured. That is, for different locations on the display screen, the light captured by the imaging device will be traveling in different directions relative to the surface of the screen. In FIG. 7, light beams $L_1$, $L_2$ and $L_3$ emitted from various angles of the display screen 80 captured by the imaging device 82. Again, considering a flat screen with z=0, the light beams L can be represented as a function of the individual coordinate and emitting angle x, y, $\theta$, $\phi$ as $L(x_1,y_1,\theta_1,\phi_1)$, $L(x_2,y_2,\theta_2,\phi_2)$, and $L(x_3,y_3,\theta_3,\phi_3)$, for example. The screen gain effect for measurements of light beams emitted from various positions of the display screen can be corrected to yield the results that would be obtained from a measurement normal to the screen (or at any specific angle to the surface of the display screen) at each point by the following steps.

Figure 1:
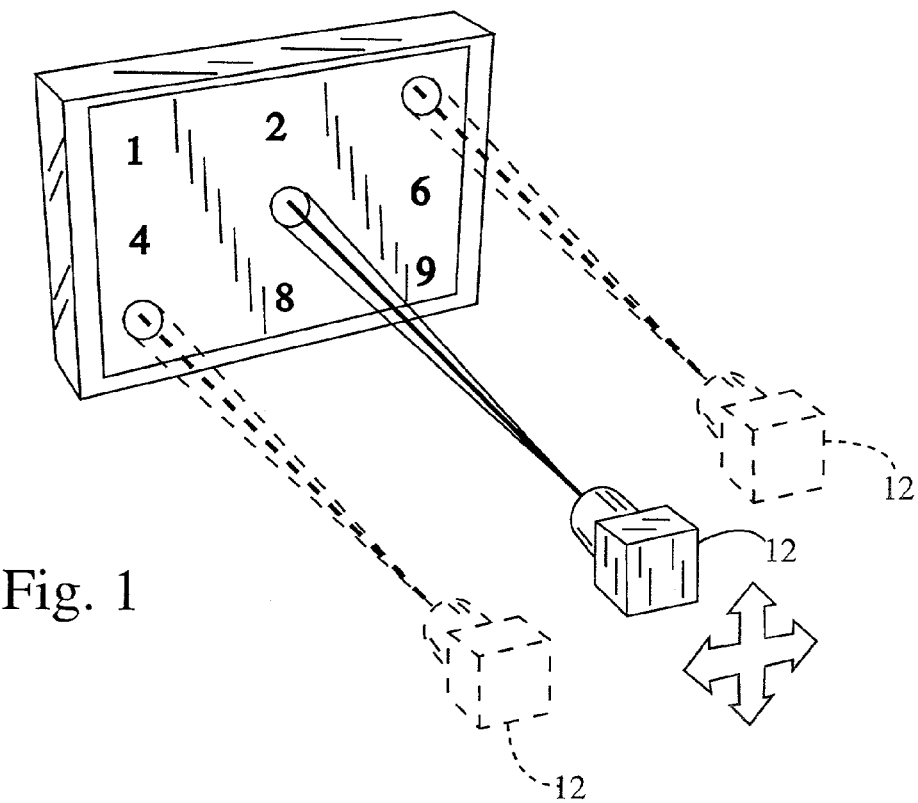
FIG. 1 shows a traditional spot measurement technique measuring luminance normal to the display screen.

Referring to FIG. 7, a display screen with a plurality of light emitting areas is shown. In this embodiment, the display screen 90 comprises 9 light emitting areas $L(x_1,y_1)$ to $L(x_9,y_9)$ arranged in a 3x3 array. Referring to FIG. 1 and FIG. 7, the spot light measurement instrument 12 is used to measure light beams emitting from the light emitting areas $L(x_1,y_1)$ to $L(x_9,y_9)$ of the display device 90 in a normal direction thereto. For measurement, the spot light measurement instrument 12 is shifted from one to another to align with each of light spots $L(x_1,y_1)$ to $L(x_9,y_9)$, such that the luminance or color normal to each light emitting area of the display screen 90 is measured. The measurement is repeated until the normal luminance or color for all 9 light emitting areas $L_n$ $(x_1,y_1)$ to $L_n$ $(x_9,y_9)$ is measured. The measured luminance, CIE color coordinate x, and CIE color coordinate y for the array is denoted as $L_n$, $L_{cx}$, $L_{cy}$ respectively, each of which is also a 3x3 array. A measurement of the entire screen of the display device is then made with the imaging light and color measurement device and the result is stored in a matrix of values $M_n$, $M_{cx}$, and $M_{cy}$ for the luminance and color measurements, respectively. These matrices will normally be 512x512 or larger arrays corresponding to the number of pixels of the imaging light and color measurement device. The coordinates and values $L_n$, $L_{cx}$, and $L_{cy}$ tested by the spot measurement device are entered into the software controlling the imaging light and color measurement device. From the matrices $M_n$, $M_{cx}$, and $M_{cy}$, the software retrieves 3x3 arrays of values corresponding to the values as measured by the imaging light and color measurement device at the same location as those points measured by the spot meter. These 3×3 arrays are stored as $M_{ns}$, $M_{cxs}$, $M_{cys}$. Screen gain correction matrices $K_{ns}$, $K_{cxs}$, and $K_{cys}$ are then calculated using the relationship $M_{ns} \times K_{ns} = L_n$, $M_{cxs} \times K_{cxs} = L_{cx}$, and $M_{cys} \times \times K_{cys} = L_{cy}$. The above process could be done for an arbitrary number of light emitting areas in arbitrary positions on the display, for light emitted in an arbitrary angle.

In order to correct the measurement made by the imaging light and color measurement device to yield the results that would be obtained from a measurement normal to the screen at all points measured by the imaging light and color measurement device, two methods are used. In the first method, the screen gain correction matrices $K_{ns}$, $K_{cxs}$, and $K_{cys}$ are used to create screen gain correction functions. The screen gain correction functions $k_n(x,y)$, $K_{cx}(x,y)$, $K_{cy}(x,y)$ are created by using a best fit algorithm for all points in the correction matrices $K_{ns}$, $K_{cxs}$, and $K_{cys}$ over a domain $(x,y)$ corresponding to the size of the display. From the correction functions, screen gain correction matrices $K_n$, $K_{cx}$, and $K_{cy}$, the same size as $M_n$, $M_{cx}$, and $M_{cy}$, are then calculated to correct all points measured by the imaging light and color measurement device. This method works well when many points on the screen are measured with the spot photometer. In the second method, screen gain correction matrices $K_n$, $K_{cx}$, and $K_{cy}$, the same size as $M_n$, $M_{cx}$, and $M_{cy}$ are calculated by interpolating between the points of the initial screen gain correction matrices created from the spot photometer measurements. This method can be used as an approximate correction when few points are measured with the spot photometer.

For each display device or screen and test set-up, the step for obtaining the normal luminance and color of each light emitting spot is required. Therefore, a database of normal luminance and color for various kinds of displays or light sources and test ste-ups is established.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A multi-point calibration method for an imaging light and color measurement system, comprising:
    aligning a spot measurement instrument with one of a plurality of light emitting areas of a light emitting surface at a specific angle to the light emitting surface and measuring the luminance or color value thereof;
    moving the spot measurement instrument to align with align with another light emitting area of the light emitting surface and the luminance or color values thereof until all the light emitting areas of interest on the light emitting surface are measured;
    measuring the luminance or color values of the light emitting surface using the imaging light and color measurement system; and
    correcting the luminance or color values measured using the imaging light and color measurement system by the luminance or color values measured from the light emitting areas.

2. The multi-point calibration method according to claim 1, wherein the light emitting surface is a display device.

3. A multi-point calibration method for an imaging light and color measurement system, which comprises a plurality of detectors applicable to image all light emitted from a plurality of detectors applicable to image all light emitted from a plurality of light emitting areas of a light emitting surface at once, the method comprising:
    inputting parameters of the light emitting surface and test set-up to be measured to a software, so as to retrieve a corresponding screen gain correction matrix, wherein the software stores a database of screen gain correction matrices for various types of light emitting surface and test set-ups;
    measuring the luminance or color values of the light emitting surface using the imaging light and color measurement system; and
    calibrating the imaging light and color measurement system by correcting the luminance or color values measured thereby with the corresponding screen gain correction matrix.

4. The multi-point calibration method according to claim 3, wherein the light emitting surface is a display device.

5. The multi-point calibration method according to claim 3, further comprising the following steps:
    measuring the luminance or color value of each of the light emitting area of the light emitting surface at a specific angle to the light emitting surface using a spot measurement instrument;
    measuring the luminance or color values of the light emitting surface using the imaging light and color measurement system; and
    creating the corresponding screen gain correction by calculating the luminance or color values measured using the imaging light and color measurement system and the luminance or color values measured using the spot measurement instrument.

6. The multi-point calibration method according to claim 5, wherein the screen gain correction matrix is created by dividing the luminance or color values measured using the spot measurement instrument with the luminance or color values measured using the imaging light and color measurement system.

7. The multi-point calibration method according to claim 3, wherein the screen gain correction matrices are used to create screen gain correction functions.

8. The multi-point calibration method according to claim 7, wherein the screen gain functions are created by using a best fit algorithm for all points in the screen gain correction matrices over a domain corresponding to the size of the light emitting surface.

9. The multi-point calibration method according to claim 8, wherein the screen gain correction functions are used to create screen gain correction matrices for all pixels of the imaging light and color measurement system.

10. The multi-point calibration method according to claim 3, wherein the screen gain correction matrices for all pixels of the imaging light and color measurement system are created by interpolating between points of the corresponding screen gain correction matrix.

* * * * *